(12) United States Patent
McNaughton

(10) Patent No.: US 6,554,605 B1
(45) Date of Patent: Apr. 29, 2003

(54) FISHING LURE MOLD AND METHOD OF USING THE SAME

(76) Inventor: Braxton McNaughton, 1404 Casey Rd., Georgiana, AL (US) 36033

(*) Notice: Subject to any disclaimer, the term of this patent is extended or adjusted under 35 U.S.C. 154(b) by 212 days.

(21) Appl. No.: 09/711,319

(22) Filed: Nov. 13, 2000

(51) Int. Cl.$^7$ ................................................ B29C 33/26
(52) U.S. Cl. ........................ 425/577; 425/438; 425/442; 425/468
(58) Field of Search ................ 425/130, 442, 425/468, 553, 572, 577, 588

(56) References Cited

U.S. PATENT DOCUMENTS

| | | | |
|---|---|---|---|
| 4,765,585 A | * 8/1988 | Wieder | 249/64 |
| 4,969,811 A | 11/1990 | Littleton | 425/116 |
| 5,700,493 A | * 12/1997 | Scarazzo et al. | 425/116 |

* cited by examiner

Primary Examiner—Jan H. Silbaugh
Assistant Examiner—Emmanuel Luk
(74) Attorney, Agent, or Firm—Smith, Gambrell & Russell, LLP

(57) ABSTRACT

An apparatus for injection molding multi-colored plastic lures, utilizing an openable mold into which a mold mandrel is pivotally inserted between a pair of mold plates. A separator bar is selectively positioned between an injection and a joining position. In the injection position the separator bar separates an adjacent and a successive element of a multi-element cavity permitting communication of a selected plastic source with an adjacent element, while preventing communication with a successive element. In a joining position the separator bar permits communication between the adjacent element and the successive element, while preventing communication with the selected plastic source. Pivotally inserted, axially extensible mandrels define an inner article form and extract the formed lures from the mold cavities when the process is completed.

14 Claims, 5 Drawing Sheets

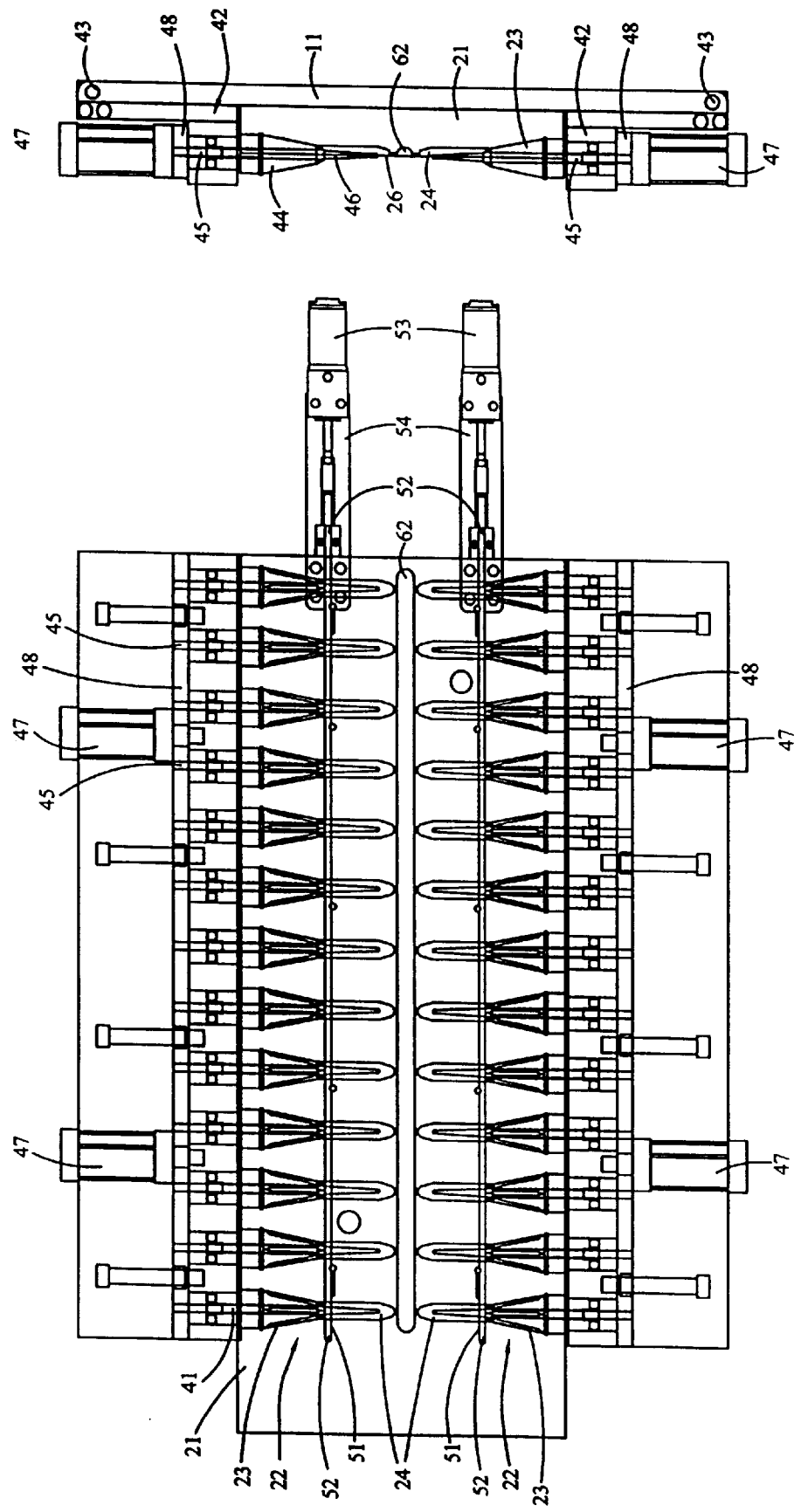

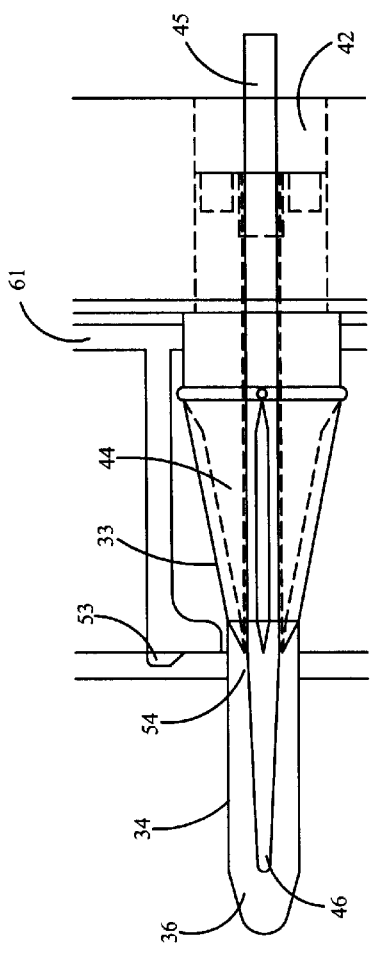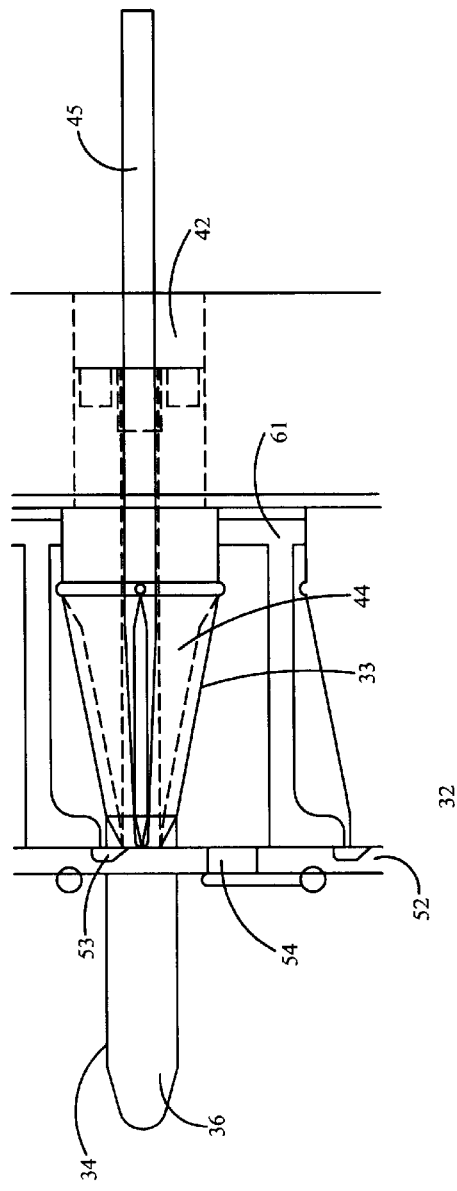
FIG. 5a
FIG. 5b

FISHING LURE MOLD AND METHOD OF USING THE SAME

FIELD OF THE INVENTION

The present invention generally relates to an apparatus and method of injection molding plastic articles. More specifically the present invention relates to an apparatus and method of injection molding multi-element plastic articles. Additionally, by using the apparatus and method of the present invention, each element of a multi-element plastic article may be formed from a separate molten plastic source. As such, a multi-element article may be formed with each element having a different plastic color, texture, or other plastic source characteristic. In the preferred embodiment, the apparatus and method contemplated by of the present invention are used to form multi-color molded fishing lures.

BACKGROUND OF THE INVENTION

There are many types of artificial baits presently used by fishermen to attract and catch fish. One of the most popular of these baits is the molded plastic bait. Frequently these baits are molded to resemble, as closely as possible, the natural baits they are intended to replicate. Numerous lures are readily available that replicate worms, salamanders, crawfish, frogs, and the like. Molded plastic baits are also produced that do not physically resemble natural baits but attract fish by imparting an action in the water that a fish finds attractive. These baits and their natural bait replicas are often produced in different colors and textures that seem to attract fish for a particular set of weather and water conditions. It is believed that a molded plastic artificial bait with multiple elements and each element having its own plastic color, texture, or other plastic property would be desirable to attract and catch fish. With present manufacturing techniques the formed lures usually must be manually extracted from their mold cavities. Once removed excess plastic, known as flashing, needs to be removed from the formed lures to finish the article. Consequently, there is a need to make plastic lures by combining multi-element action with multi-element color combinations and to be able to manufacture these lures economically and efficiently.

SUMMARY OF THE INVENTION

It is an object of the present invention to provide an apparatus and method for injection molding multi-element plastic articles. A further object of the invention is to provide an apparatus and method for selectively injecting a separate source of molten plastic into each element of a multi-element plastic article, permitting variation of color, texture, or other plastic properties between elements of the formed article. Moreover, it is an object of the present invention to improve the speed and efficiency of the manufacturing process.

The first two objects of the present invention are achieved by interposing at least one selectively positionable separator bar between successive elements of multi-element cavities defined between movable and stationary mold plates. The multi-element cavities in the mold plates define an outer form of the multi-element article. Axially extensible mandrels, inserted within the multi-element cavities, successively define an inner article form for each element of the multi-element article. In an injection position, the separator bar isolates communication from a selected plastic source to a discrete element defined between an element of a multi-element mold cavity, a portion of the extensible mandrel and the interposed separator bar. Plastic from the selected plastic source is injected to the discrete element through a notch in the separator bar, forming a discrete article element. When separator bar is selectively positioned in a joining position, separator bar permits communication between the discrete element defined by its injection position and a successive element of the multi-element cavity and also permits axial extension of a mandrel section into the successive element cavity. Plastic from a selected source of molten plastic is then injected into the successive element cavity, forming the successive article element. Because in this position the separator bar allows communication with the adjacent elements, the selected source of molten plastic joins with the previously formed discrete element. By including multiple separator bars, successive elements may be formed and joined with a preceding element, each formed with a different plastic source. In the preferred embodiment, multi-element, multi-color fishing lures are produced.

Speed and efficiency of manufacture are achieved by configuring the mandrels to be pivotally inserted and retracted from between the stationary mold plate and an open movable mold plate. By this configuration, the finished molded articles may be lifted from the stationary mold plate cavities as the mandrels are pivoted from between the opened plates. The operator may then simply pluck the finished article from the end of the mandrel.

BRIEF DESCRIPTION OF THE DRAWINGS

FIG. 3 is a combined plan view and end view of the stationary mold plate with mandrels inserted;

FIG. 5A is a detail view of a mold cavity with a separator bar in the joining position;

FIG. 5B is a detail view of a mold cavity with a separator bar in the injection position.

DETAILED DESCRIPTION OF THE INVENTION

Figure 1:
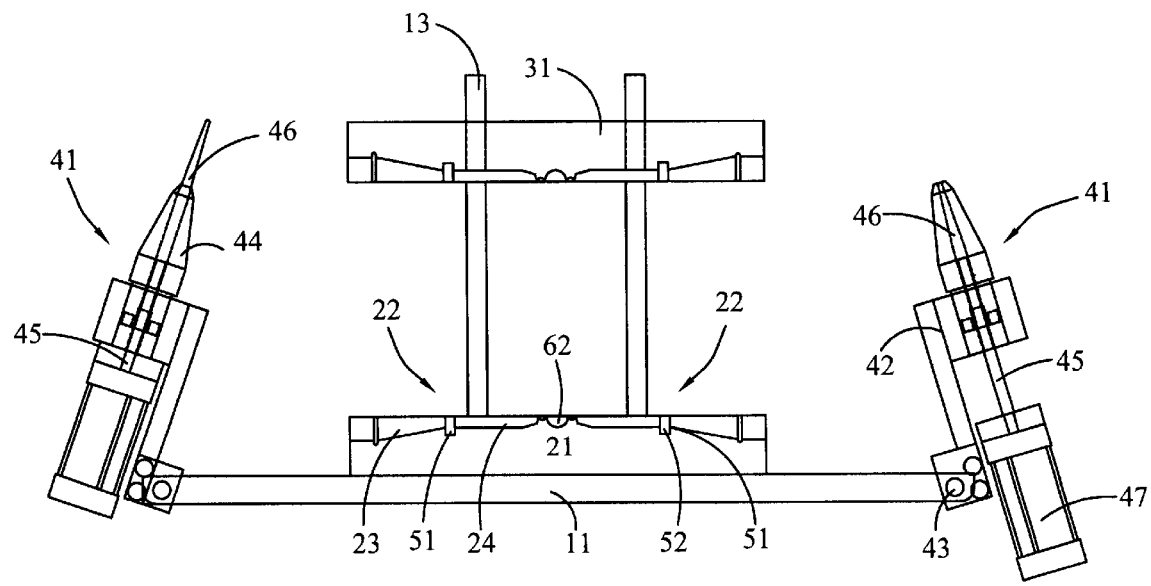
FIG. 1 depicts an end view of the lure mold apparatus of the present invention with the movable mold plate in the open position, and mandrels in the retracted position.

Referring to the drawings for a clearer understanding of the invention, it may be seen in FIG. 1 that the apparatus is comprised of a base member 11, a stationary mold plate 21, a moveable mold plate 31, and at least one mold mandrel 41. Stationary mold plate 21 is rigidly affixed to base member 11. Moveable mold plate 31 is selectively positioned between precise mating abutment with stationary mold plate 21 as in FIG. 2 and an open position, as in FIG. 1. Various methods of opening and closing such mold plates are well known in the art and include a hinged configuration or a guide pin 13 configuration as shown in FIG. 1. Mold mandrel 41 is secured to a receiver 42, which is pivotally attached to base member 11 at pivot pin 43, and is selectively positioned between an inserted position, as depicted in FIG. 2, and a retracted position, as depicted in FIG. 1.

Figure 2:
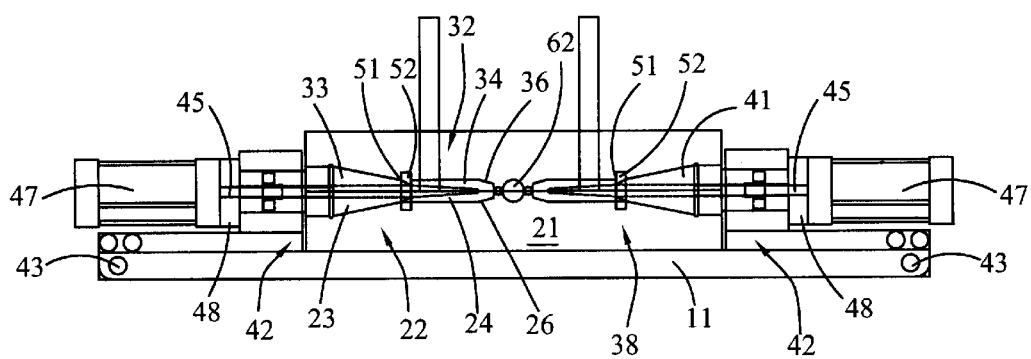
FIG. 2 depicts an end view of the lure mold apparatus with the movable mold plate in the closed position, and mandrels in the inserted position.
Figures 4A, 4B:
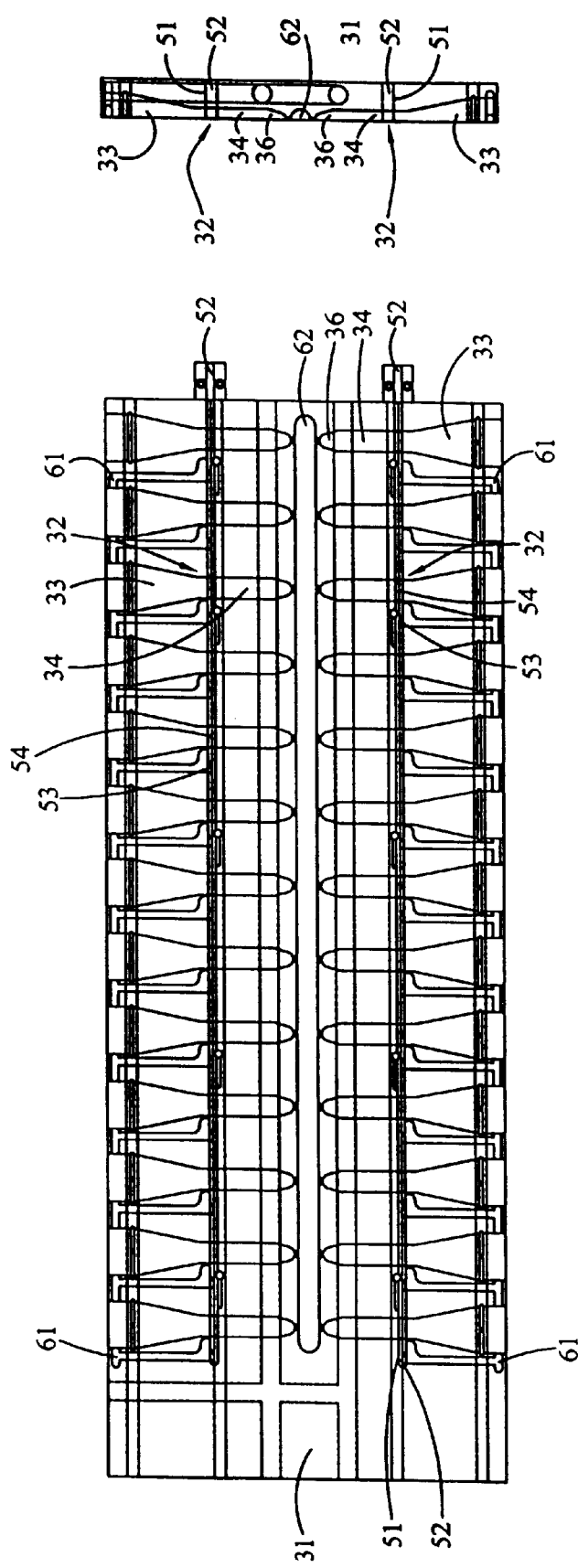
FIG. 4 is a combined plan view and end view of the movable mold plate.

As seen in FIGS. 1, 2 and 3, stationary mold plate 21 defines at least one first multi-element cavity 22, integrally formed on a face of mold plate 21, cavity 22 defining one half of an outer article form. As seen in FIGS. 1, 2 and 4, movable mold plate 31 defines at least one second multi-element cavity 32, integrally formed on a face of mold plate 31, cavity 32 defining a second half of an outer article form. Normally second cavity 32 will be a mirror image of first cavity 22 however, the invention contemplated and described herein is not confined to the manufacture of articles having such bilateral symmetry.

At least one slot 51 is formed in abutting faces of stationary mold plate 22 and movable mold plate 32. Slot 51 is positioned to intersect elements of first and second multi-element cavities 22 & 32. A separator bar 52 is received in sliding sealing contact within each slot 51. As seen in FIGS. 3, 5A, 5B, & 6, each separator bar 52 is selectively positioned between an injection position and a joining position by an actuator 53 attached at a first end of separator bar 52 and attached to an actuator plate 54 secured to base member 11 at a second end.

At least one channel 61 is integrally defined within movable mold plate 31 to provide fluid communication between a selected plastic source P and a separator bar 52 corresponding therewith. Alternately, channel 61 may be defined in stationary mold plate 21 or by abutting mirror image channels defined in both mold plates 21 & 31. Each such arrangement is intended to be included in the appended claims as they are suitable alternatives to practice the invention described herein.

As is best seen in FIGS. 5A & 5B, each separator bar 52 has at least one groove 53 formed therein for each joined multi-element cavity 38 intersected thereby and an orifice 54 extending through separator bar 52 adjacent to but spaced from each groove 53. With separator bar 52 in its injection position, groove 53 provides communication between a selected plastic source within channel 61 and an adjacent element of multi-element cavity 38. Orifice 54 is disposed laterally of multi-element cavities 38 such that fluid communication between an adjacent element 23 & 33 and a successive element 24 & 34 is blocked. With separator bar 52 in its joining position, groove 53 is disposed laterally of multi-element cavities 38 and blocks communication with selected plastic source P. Orifice 54 is positioned such that fluid communication is established between adjacent element 23 & 33 and successive element 23 & 33 intersected by that separator bar 52.

Figure 6:
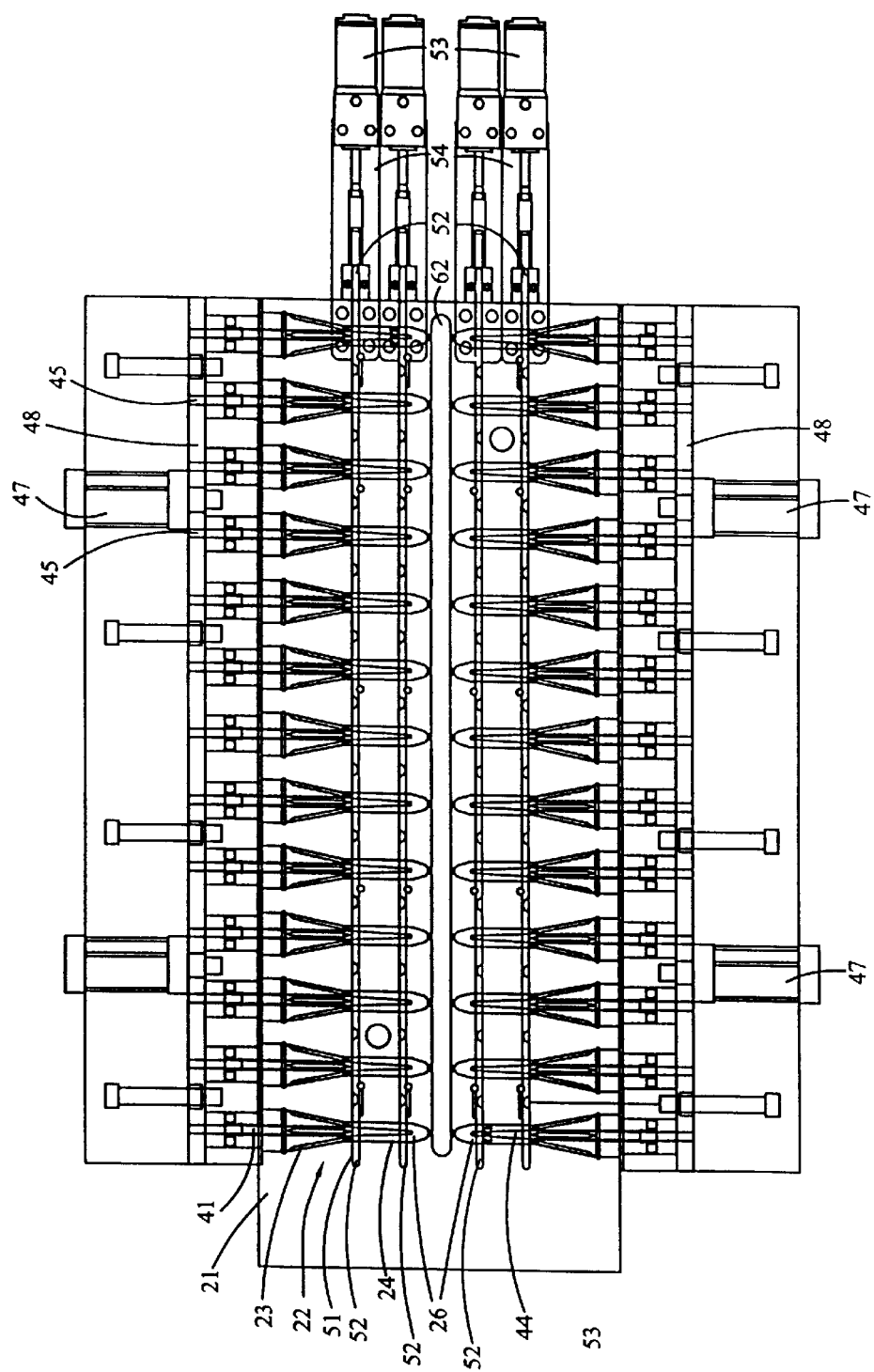
FIG. 6 is a plan view of a stationary mold plate with multiple separator bars and mandrels inserted.

As described above, mandrel 41 is pivotally inserted between multi-element cavities 22 & 32, and defines an inner article form thereof Mandrel 41 comprises at least one surrounding section 44 attached to an inner face of receiver 42 and at least one axially extensible inner section 46. Inner section 46 is selectively positioned between a retracted position and at least one extended position by an actuator rod 45 acting through receiver 42 and surrounding section 44 by activation of actuator 47. As shown in FIGS. 1, 3, & 6, actuators 47, manipulate multiple actuator rods 45 by actuating an actuator bar 48. By this arrangement the number of actuators 47 required for the apparatus is reduced. In a retracted position, inner section 46 is substantially retained within surrounding mandrel section 44, with the ends of mandrel sections 44 & 46 mating in abutment with a separator bar 52 positioned in an injection position. A plastic source is communicated through groove 53 to form the element defined within cavity 38 and adjacent to groove 53.

Referring to FIG. 6, with separator bar 52 in a joining position, actuator 47 extends inner section 46 through separator bar orifice 54 and becomes a surrounding section 44' of a subsequent inner section 46'. Surrounding section 44' and subsequent inner section 46' extend within cavity 38 to abut with a subsequent separator bar 52' selected to its injection position defining a subsequent element thereby. Plastic from a plastic source P' is transferred through groove 53' to form the element defined within joined multi-element cavity 38 and adjacent groove 53' and joins with the previously formed element by communicating this plastic source through orifice 54.

Formation of a final element 26 & 36 of a multi-element article does not require a separator bar 52 for communicating a plastic source thereto. A channel 62 intersecting final element 26 & 36 provides communication from a plastic source P' with final element 26 & 36. With the preceding separator bar 52 selected to its joining position, plastic source P' is communicated to final element 26 & 36, forms the element and joins with the preceding element through orifice 54.

Once the article is fully formed, mold plates 21 & 32 are opened. Mold mandrel 41 is pivoted outwardly from between mold plates 21 & 31, and will retain the formed article thereon. Mandrel inner section 46 may be retracted or left in an extended position. With the formed article removed from the mold cavities 38 by mandrel 41, it may be grasped by the operator and removed from the apparatus.

I claim:

1. An apparatus for injection molding multi-element plastic articles using a pressurized heated plastic from a plurality of defined sources comprising in combination with said sources a base member, a stationary mold plate, a moveable mold plate, and at least one mold mandrel,
   a. said stationary mold plate rigidly affixed to said base member, said plate defining,
      1) at least one first multi-element mold cavity integrally formed therein, and
      2) means for providing fluid communication between a predetermined plastic source from said plurality of defined sources to a selected element of said multi-element cavity,
   b. said movable mold plate selectively positioned between precise mating abutment with said stationary mold plate and a retracted open position, said movable mold plate defining,
      1) at least one second multi-element mold cavity integrally formed therein, said first and second multi-element cavities defining a joined multi-element cavity defining an outer form of said multi-element article during abutment of said mold plates, and
      2) means providing fluid communication between said predetermined plastic source to a selected element of said multi-element cavity,
   c. said mandrel secured to a receiver pivotally attached to said base member, said mandrel selectively inserted between said first and second multi-element cavities, said mandrel defining an inner form of said multi-element article.

2. The apparatus of claim 1 wherein said stationary mold plate further defines at least one bank of first multi-element mold cavities spaced apart on said stationary mold plate, said movable mold plate further defines at least one bank of second multi-element mold cavities spaced apart on said movable mold plate, and at least one bank of mandrels spaced in alignment relative said first and second mold cavities, said banks defining a plurality of multi-element article forms.

3. The apparatus of claim 2 wherein said banks are arrayed in symmetrically opposed pairs.

4. The apparatus of claim 1 wherein said means providing fluid communication comprises a channel formed in at least one abutting face of said mold plates providing fluid communication with one predetermined plastic source and an end element of said joined multi-element cavity.

5. The apparatus of claim 1 wherein said means providing fluid communication comprises at least one slot formed in an abutting face of each said mold plate, each said slot intersecting a separate element of said multi-element cavity, a separator bar received in sliding sealing contact within each said slot selectively positioned between an injection position and a joining position,
   a. each said separator bar having formed therein at least one groove providing selective fluid communication with one predetermined plastic source and an adjacent element of said multi-element cavity and said separator bar blocking fluid communication with a successive element while in said injection position,
   b. each said separator bar further defining at least one orifice extending through said separator bar, said orifice providing fluid communication between said adjacent and successive elements only with said separator bar in said joining position.

6. The apparatus of claim 5 wherein said means providing fluid communication comprises at least one channel formed in at least one said mold plate, said channel communicating between a predetermined plastic source and each said groove on a corresponding separator bar.

7. The apparatus of claim 5 wherein each said separator bar is selectively positioned by an actuator having a first end attached to said base member and a second end operatively attached to said separator bar.

8. The apparatus of claim 5 wherein said mandrel further comprises at least one axially extensible inner mandrel section selectively positioned between a retracted position and an extended position, such that
   a. in said retracted position, said inner section is retained within a surrounding mandrel section and abuts said separator bar in said injection position,
   b. in said extended position, said mandrel inner section extends through said separator bar orifice and into said successive element cavity, defining an inner elemental form therein.

9. The apparatus of claim 8 wherein each said inner mandrel section successively extending from said surrounding mandrel section through said orifice and abutting a corresponding separator bar in said injection position, said inner mandrel section defining an inner form therein.

10. The apparatus of claim 8 wherein said inner mandrel section is positioned by an actuator operatively attached between said receiver and an actuator bar, said inner mandrel section operatively attached to said actuator bar.

11. The apparatus of claim 6 wherein said multi-element cavity comprises a conical element and a cylindrical element, said cylindrical element extendable axially from an apex of said conical element.

12. The apparatus of claim 6 wherein said surrounding mandrel section comprises a conical body and said mandrel inner section comprises a cylindrical rod,
   a. said conical body having a plurality of spaced, linearly extending grooves, said conical body in cooperation with said cavity conical element defining a multi-stranded skirt element, said strands joined at a skirt junction defined by said cavity apex and an apex of said mandrel conical body,
   b. said cylindrical rod in said extended position defining, in cooperation with said cavity cylindrical element, a cylindrical tube element with an end of said tube element abutting said skirt junction.

13. The apparatus of claim 1 wherein said pressurized heated plastic sources are different colors.

14. An apparatus for injection molding multi-element plastic articles using a pressurized heated plastic from a plurality of defined sources comprising in combination with said sources a base member, a stationary mold plate, a moveable mold plate, and at least one mold mandrel,
   a. said stationary mold plate rigidly affixed to said base member, said plate defining,
      1) at least one first multi-element mold cavity integrally formed therein, and
      2) means for providing fluid communication between a predetermined plastic source from said plurality of defined sources to a selected element of said multi-element cavity,
   b. said movable mold plate selectively positioned between precise mating abutment with said stationary mold plate and a retracted open position, said movable mold plate defining,
      1) at least one second multi-element mold cavity integrally formed therein, said first and second multi-element cavities defining a joined multi-element cavity defining an outer form of said multi-element article during abutment of said mold plates, and
      2) means providing fluid communication between said predetermined plastic source to a selected element of said multi-element cavity,
   c. said mandrel secured to a receiver pivotally attached to said base member, said mandrel selectively inserted between said first and second multi-element cavities, said mandrel defining an inner form of said multi-element article,
   d. a separator bar slidably positioned in a slot formed in said mold plates separating said elements of said multi-element cavity and selectively movable to interrupt said fluid communication.

* * * * *